United States Patent
Tajima et al.

(10) Patent No.: US 7,011,451 B2
(45) Date of Patent: Mar. 14, 2006

(54) ROTATING SPEED SENSOR UNIT AND WHEEL BEARING ASSEMBLY CARRYING THE SAME

(75) Inventors: Eiji Tajima, Shizuoka (JP); Hisashi Ohtsuki, Shizuoka (JP); Akio Sakaguchi, Shizuoka (JP); Koji Kametaka, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/419,159

(22) Filed: Apr. 21, 2003

(65) Prior Publication Data

US 2003/0202723 A1 Oct. 30, 2003

Related U.S. Application Data

(62) Division of application No. 09/657,093, filed on Sep. 7, 2000, now Pat. No. 6,573,705.

(30) Foreign Application Priority Data

Sep. 10, 1999 (JP) ............................................ 11-257836

(51) Int. Cl.
*F16C 32/00* (2006.01)

(52) U.S. Cl. ...................................... 384/448; 384/477
(58) Field of Classification Search ................ 384/448, 384/477, 478, 480, 484
See application file for complete search history.

(56) References Cited

U.S. PATENT DOCUMENTS

| | | | |
|---|---|---|---|
| 3,500,091 A | | 3/1970 | Jones |
| 3,510,138 A | * | 5/1970 | Bowen et al. .............. 277/571 |
| 4,502,739 A | | 3/1985 | Flander |
| 4,968,156 A | * | 11/1990 | Hajzler ........................ 384/448 |
| 4,988,220 A | * | 1/1991 | Christiansen et al. ....... 384/448 |
| 5,195,830 A | | 3/1993 | Caillault et al. |
| 5,287,738 A | * | 2/1994 | Polinsky et al. ............ 73/118.1 |
| 5,293,124 A | * | 3/1994 | Caillaut et al. ............. 324/173 |
| 5,309,094 A | * | 5/1994 | Rigaux et al. .............. 324/174 |
| 5,385,411 A | * | 1/1995 | Shirai et al. ................ 384/446 |
| 5,434,503 A | | 7/1995 | Rigaux et al. |
| 5,492,417 A | * | 2/1996 | Baker et al. ................ 384/448 |
| 5,523,681 A | | 6/1996 | Hajzler et al. |
| 5,564,839 A | | 10/1996 | Ouichi et al. |
| 5,570,013 A | | 10/1996 | Polinsky et al. |
| 5,722,777 A | | 3/1998 | Ouchi |
| 5,852,361 A | | 12/1998 | Ouchi et al. |
| 5,863,124 A | | 1/1999 | Ouchi et al. |
| 5,898,388 A | | 4/1999 | Hofmann et al. |
| 6,217,220 B1 | | 4/2001 | Ohkuma et al. |
| 6,267,509 B1 | * | 7/2001 | Morimura ................... 384/448 |
| 6,328,476 B1 | | 12/2001 | Nakamura et al. |
| 6,520,683 B1 | * | 2/2003 | Toda et al. ................. 384/448 |

FOREIGN PATENT DOCUMENTS

| | | |
|---|---|---|
| JP | 7-36288 | 8/1995 |
| JP | 8-43411 | 2/1996 |
| JP | 8-281018 | 10/1996 |
| JP | 9-288117 | * 11/1997 |

* cited by examiner

*Primary Examiner*—William C. Joyce
(74) *Attorney, Agent, or Firm*—Wenderoth, Lind & Ponack, L.L.P.

(57) ABSTRACT

A wheel bearing assembly is provided which has a rotating speed sensor unit which includes a seal for preventing entry of foreign matter and which takes up little space and thus can be mounted on the wheel bearing assembly without increasing the axial dimension of the fixed member of the wheel bearing assembly. The assembly includes a fixed member fixed to a vehicle body, and a rotary member rotatably supported in the stationary member through a bearing and mounted to a vehicle wheel. An annular sensor is fitted to a knuckle, which is a part of the fixed member, on the inboard side of the bearing. A sensor seal is fitted to the annular sensor and has a seal lip kept in slide contact with a seal land formed on a constant-velocity joint outer ring, which is a part of the rotary member, to define a sealed space on the inboard side of the bearing. An encoder is mounted on a bearing inner ring, which is a part of the rotary member, in the sealed space. The sensor element is disposed in the sealed space, opposite the encoder.

10 Claims, 8 Drawing Sheets

ROTATING SPEED SENSOR UNIT AND WHEEL BEARING ASSEMBLY CARRYING THE SAME

This is a divisional application of Ser. No. 09/657,093, filed Sep. 7, 2000 now U.S. Pat. No. 6,573,705.

BACKGROUND OF THE INVENTION

This invention relates to a wheel speed sensor unit and a wheel bearing assembly carrying the wheel speed sensor unit.

Wheel speed sensors are mounted on wheel bearings to supply wheel speed signals, for example to an ECU of an ABS.

A typical such wheel speed sensor unit includes an encoder mounted on a rotary member of the vehicle, and a sensor mounted on a stationary member so as to oppose the encoder. Japanese patent publication 8-281018 discloses an arrangement in which a flange-like rotary disk is provided on the rotary member outside a seal for sealing the gap between the fixed member and the rotary member, and a multipolar-magnetized encoder is mounted on the outer end face of the disk. The encoder is exposed to the outside.

Japanese utility model publication 7-36288 discloses an arrangement in which an encoder is provided between two rows of raceways on an inner ring of a wheel bearing assembly, and a sensor is inserted in a hole formed in the outer ring so as to oppose the encoder. The encoder is thus mounted in a sealed space.

In the arrangement shown in Japanese patent publication 8-43411, an encoder is arranged on an outer surface of a rotary member on a side inboard of the bearing, a seal member is mounted on the inboard side of the fixed member, and a sensor is mounted inside the seal member so as to oppose the encoder. The encoder is mounted inside the seal member and outside the bearing.

The first arrangement has a drawback that magnetic powder tends to adhere to the surface of the magnetized encoder during use. This may cause deterioration in the pitch accuracy. The second arrangement has a drawback that the axial dimension for mounting the encoder and sensor is not sufficient. In the third arrangement, since the encorder and the sensor have to be arranged inside of the seal member, the axial dimension of the inboard side end of the stationary member has to be accordingly large.

An object of the invention is to provide a rotating speed sensor unit which includes a seal for preventing entry of foreign matter and which takes up smaller mounting space and thus can be mounted on a wheel bearing assembly without increasing the axial dimension of the stationary member, and to provide a wheel bearing assembly having such a sensor unit.

SUMMARY OF THE INVENTION

With the rotating speed detecting device, the encoder rotates integrally with the rotary member and the sensor detecting portion detects its rotating speed. Since this arrangement is an inside-mount type in which the encoder and the sensor are protected by the sensor seal member, entry of dust and debris such as magnetic powder and other foreign matter is prevented. Also, since the seal member is mounted on a portion of the sensor, it is not necessary to provide a mounting portion for the seal member on any other part. Also, the encoder can be mounted in the gap between these parts.

Also, by mounting the seal member on the rotary member inboard of the sensor, bringing the seal lips of the seal member into sliding contact with a seal land formed on the inner surface of the fixed member, and arranging the encoder so as to oppose the sensor detecting portion inside of the seal member, it is possible to detect the rotating speed while preventing entry of foreign matter.

According to this invention, there is provided a wheel bearing assembly comprising a fixed member adapted to be fixed to a vehicle body, a rotary member rotatably supported in the stationary member through a bearing and adapted to be mounted to a vehicle wheel, an annular sensor fitted in the fixed member on an inboard side of the bearing and having a sensor element, a sensor seal for sealing a gap between the fixed member and the rotary member, the sensor seal being fitted in the annular sensor on an inboard side of the sensor element and having a seal lip kept in slide contact with a seal land formed on the rotary member, and an encoder mounted on the rotary member in a space between the sensor seal and the bearing so as to oppose the sensor element of the sensor.

With this wheel bearing assembly, the load of the vehicle body is supported by the wheels through the bearing, and the rotating speed of the rotary member which rotates with the wheels is detected by the rotating encoder and the sensor opposing it. Since this arrangement is an inside-mount type in which the encoder and the sensor are provided inside the seal member, foreign matter entering from outside is prevented by the seal member. Also, since the seal member is fitted in the inner surface of the sensor at one end, it is not necessary to provide a mounting portion for the seal member on the fixed member. Thus, the encoder can be housed within the width of the sensor, so that the encoder and the sensor can be mounted with enough room of space.

In another embodiment, a sensor is fitted in the fixed member on an inboard side of the bearing, a sensor seal for sealing a gap between the fixed member and the rotary member is fitted on the rotary member on an inboard side of the sensor element and has a seal lip kept in slide contact with a seal land formed on the fixed member, and an encoder is mounted on the rotary member in a space between the sensor seal and the bearing so as to oppose the sensor element of the sensor.

Other features and objects of the present invention will become apparent from the following description made with reference to the accompanying drawings, in which:

DETAILED DESCRIPTION OF THE PREFERRED EMBODIMENT

Figure 1:
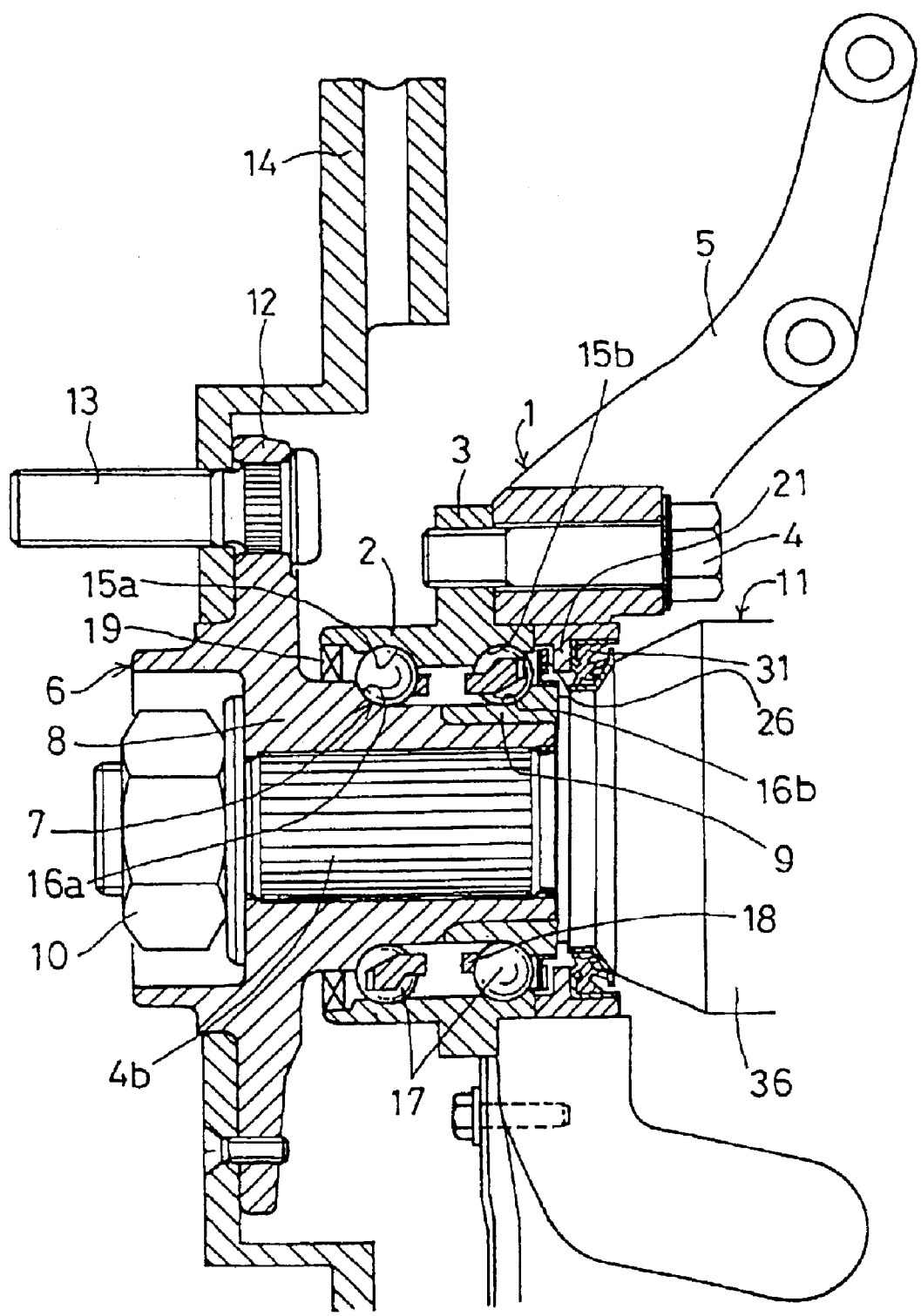
FIG. 1 is a sectional view of a first embodiment.

FIG. 1 shows a wheel bearing assembly carrying a rotating speed sensor unit of a first embodiment. The wheel bearing assembly comprises a fixed or stationary member 1 and a rotary member 6. The fixed member 1 includes an outer member 2 having a flange 3, and a knuckle 5 fixed to the flange 3 by bolts 4. The knuckle is secured to the vehicle body.

The rotary member 6 comprises an inner member 8 rotatably mounted in the outer member 2 through a bearing 7, an inner ring 9 pressed on the inner member 8, and a constant-velocity joint 11 having its stem 4b inserted in and splined to the inner member 8 and fixed in position by a nut 10. At its outboard end, the inner member 8 is formed with a wheel mounting flange 12 to which a brake rotor 14 is mounted by wheel-fastening bolts 13.

The bearing 7 comprises two rows of raceways 15a and 15b formed on the radially inner surface of the outer member 2, an outboard raceway 16a formed on the radially outer surface of the inner member 8 opposite the raceway 15a, an inboard raceway 16b formed on the inner ring 9, opposite the raceway 15b, and rolling elements 17 received between the respective opposed pairs of raceways. The rolling elements 17 are circumferentially separated from each other by a retainer 18.

The outboard end of the gap between the outer member 2 and the inner member 8, in which are disposed the rolling elements 17, is sealed by a seal 19.

Figure 2:
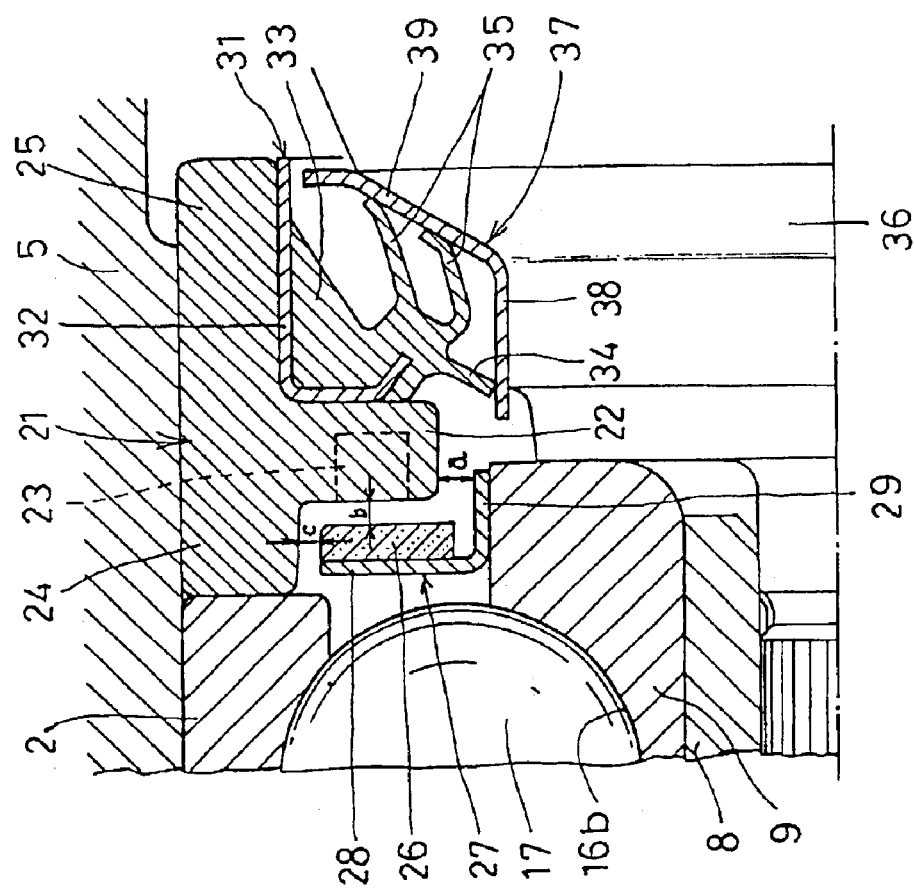
FIG. 2 is an enlarged sectional view of the same.

An annular sensor 21 is pressed in the knuckle 5 with its outboard end abutting the inboard end of the outer member 2. As shown in FIG. 2, the sensor 21 comprises a body molded of synthetic resin having an outboard flange 24, an inboard flange 25 and a radially inwardly extending protrusion 22, and a sensor element 23 embedded in the outboard side of the protrusion 22 so as to face the bearing 7.

A metal ring 27 having an L-shaped section has its cylindrical portion 29 pressed onto the inner ring 9 at its inboard end and has an encoder 26 made of a multipolar magnetized rubber and bonded to its radially outwardly extending flange 28 by vulcanization so that the encoder 26 axially opposes the sensor element 23 with a gap left therebetween and radially opposes the inner surface of the outboard flange 24 through a gap.

The gap a between the cylindrical portion 29 of the ring 27 and the protrusion 22 of the sensor 21, the gap b between the encoder 26 and the protrusion 22 and the gap c between the encoder 26 and the outboard flange 24 form a labyrinth seal to prevent leak of grease in the bearing 7.

A sensor seal 31 is fitted in the corner space defined by the radially inner surface of the inboard flange 25 of the sensor 21 and the inboard surface of the protrusion 22. The sensor seal 31 comprises a metal ring 32 having an L-shaped section and fitted in the inboard flange 25 of the sensor 21, and a resilient seal element 33 bonded to the ring 32 and having a radial lip 34 and two side lips 35.

Opposite the sensor seal 31, a slinger 37 of stainless steel is pressed onto the shoulder of the outer ring 36 of the constant-velocity joint 11 to form a seal land. The slinger 37 has a cylindrical base 38 and an inclined flange 39. The radial lip 34 is in slide contact with the cylindrical base 38 while the side lips 35 are in slide contact with the inclined flange 39. The seal land may be formed directly on the outer surface of the outer ring 36, omitting the slinger 37. But the seal land formed by the slinger provides better protection against rust and higher sealability.

The sensor 21, encoder 26 and sensor seal 31 form a rotating speed sensor unit.

The sensor 21 is fitted in the knuckle 5, which is, as described earlier, a part of the fixed member 1 formed by the outer member 2, knuckle 5 and outer ring 36. The encoder 26 is mounted on the bearing inner ring 9, which is a part of the rotary member 6 formed by the inner member 8, inner ring 9 and universal joint 11. The brake rotor 14 may be considered to be a part of the rotary member 6.

In this wheel bearing assembly, a space is inevitably formed by the knuckle 5, outer member 2, inner ring 9 and CVJ outer ring 36. The sensor 21 is mounted in this space with the encoder 26 received in a space defined by the sensor 21 and the inner ring 9 and the sensor seal 31 received in a space defined by the sensor 21 and the CVJ outer ring 36. Thus, it is possible to determine the size of such parts as the outer member 2, knuckle 5, inner ring 9 and inner member 8 as small as possible.

When the wheel (not shown) is driven by the engine through the constant-velocity joint 11 and the inner member 8, the encoder 26 rotates together. The magnetic field thus changes as the encoder rotates. The sensor element 23 picks up this change in magnetic field and produces a signal indicative of the rotating speed. The vehicle load is supported through the knuckle 5, the outer member 2 and the bearing 7.

The outboard seal 19 and the inboard sensor seal 31 prevent entry of dust, muddy water, etc. into the bearing. In particular, the three lips 34, 35 of the sensor seal 31 effectively prevent entry of foreign matter. Leak of grease from the bearing 7 is prevented by the labyrinth seal formed by the gaps having widths a, b, c and the radial lip 34 of the sensor seal 31.

Figure 3:
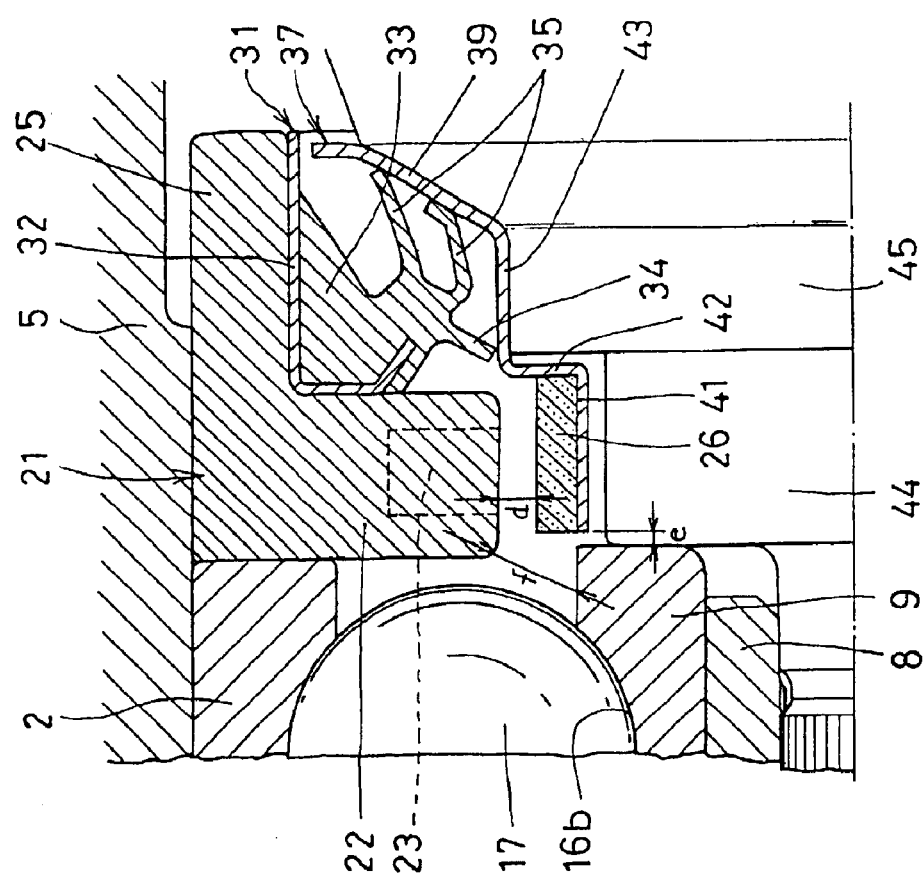
FIGS. 3 and 4 are enlarged sectional views of modified embodiments.
Figure 4:
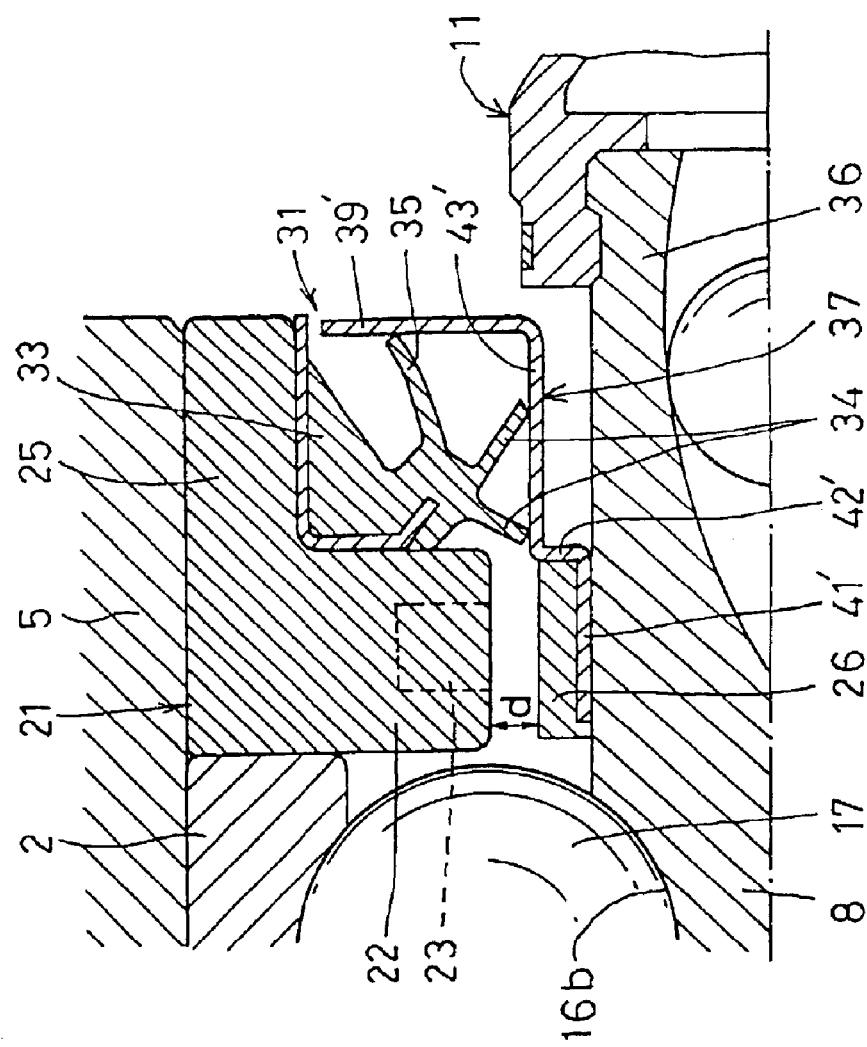

FIGS. 3 and 4 show modified structures for mounting the encoder 26 and the inboard seal 31.

The sensor 21 of FIG. 3 has no outboard flange 24, and comprises a radially inward protrusion 22 and an inboard flange 25. The sensor 21 is fitted in the knuckle with its outboard end abutting the inboard end of the outer member 2. The slinger 37 is made of stainless steel and comprises a small-diameter cylindrical portion 41, a large-diameter cylindrical portion 43, a shoulder 42 between the cylindrical portions 41 and 43, and an inclined flange 39 extending obliquely radially outwardly from the inboard end of the large-diameter cylindrical portion 43. The portion 41 has a slightly larger diameter than a small-diameter portion 44 of the CVJ outer ring 36 with its large-diameter portion 43 pressed onto an intermediate-diameter portion 45 of the CVJ outer ring 36.

An encoder 26 is joined to the small-diameter portion 41 and the shoulder 42 of the slinger 37 and faces the radially inner surface of the protrusion 22 with a small gap having a width d left therebetween. A sensor element 23 is embedded in the radially inner surface of the protrusion 22.

The gap e between the encoder 26 and the inner ring 9 and the gap f between the protrusion 22 and the inner ring 9 are set to such values as to form a labyrinth.

The cylindrical portion 43 and the inclined flange 39 serve as seal lands with which the radial lip 34 and the side lips 35 are brought into slide contact, respectively. This sensor unit operates in exactly the same manner as the sensor unit of the first embodiment.

Since the encoder 26 is mounted on the slinger 37 in this embodiment, the ring 27 is not needed. Thus, the sensor unit of this embodiment is smaller in the number of parts and can be assembled more easily.

Like the sensor of FIG. 3, the sensor 21 of FIG. 4 includes the protrusion 22 and the inboard flange 25, and the sensor element 23 is embedded in the radially inner surface of the protrusion 22. The slinger 37 comprises a small-diameter portion 41' pressed on the maximum-diameter portion of the CVJ outer ring 36, a large-diameter portion 43', a shoulder 42' between the small-diameter and large-diameter portions 41' and 43', and a flange 39' extending radially outwardly from the inboard end of the large-diameter portion 43'. The portion 43' and the flange 39' serve as seal lands.

An encoder 26 is joined to the small-diameter portion 41' and the shoulder 42'. The gap d between the encoder 26 and the inner surface of the sensor 21 forms a labyrinth seal. The seal element 33 has two radial lips 34 kept in slide contact with the large-diameter portion 43' and a side lip 35 in slide contact with the flange 39'.

Figure 7:
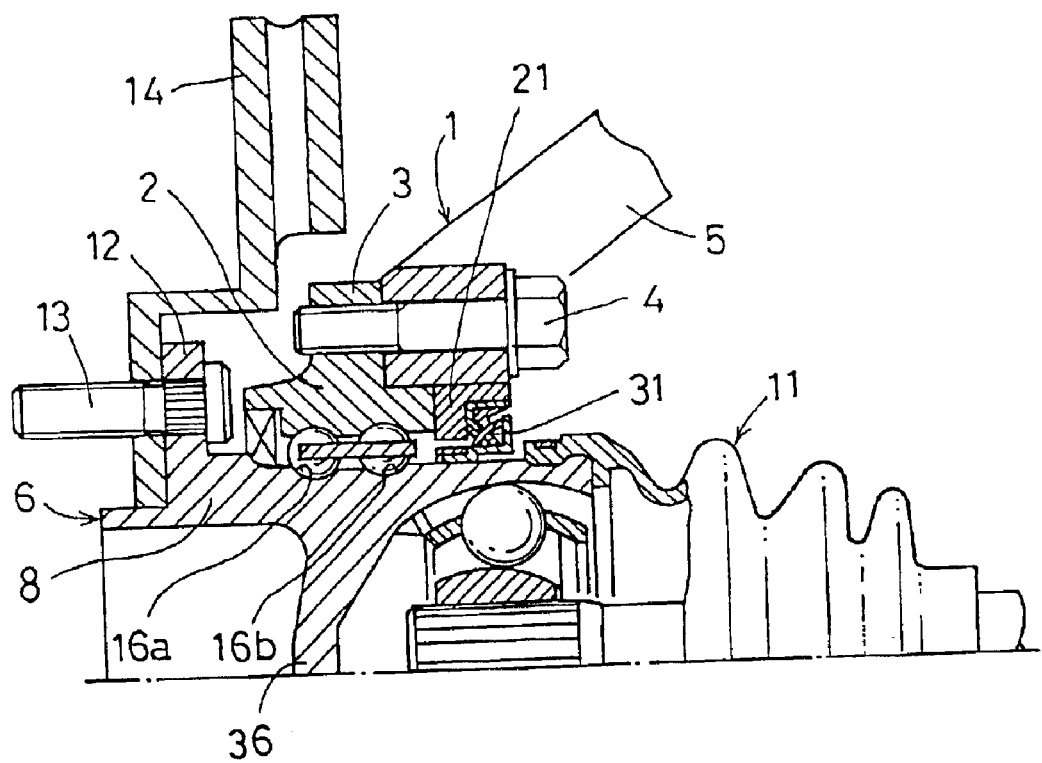

The sensor unit of FIG. 4 is mounted on a wheel bearing assembly of the type in which the outer ring 36 of the constant-velocity joint 11 is integral with the inner member 8 (FIG. 7).

Since in the above-described wheel bearing assemblies the sensor 21 is mounted on the inner periphery of the knuckle 5 and the sensor seal 31 is mounted in a gap between the sensor 21 and the outer ring 36 of the constant-velocity joint 11, it is possible to assemble the knuckle 5, constant-velocity joint 11, outer member 2, bearing 7, and inner member 8 together in a single unit. It is optional whether or not the brake rotor 14 is included in the unit. The corresponding elements in the subsequent embodiments, too, can also be assembled together in a single unit.

Figure 5:
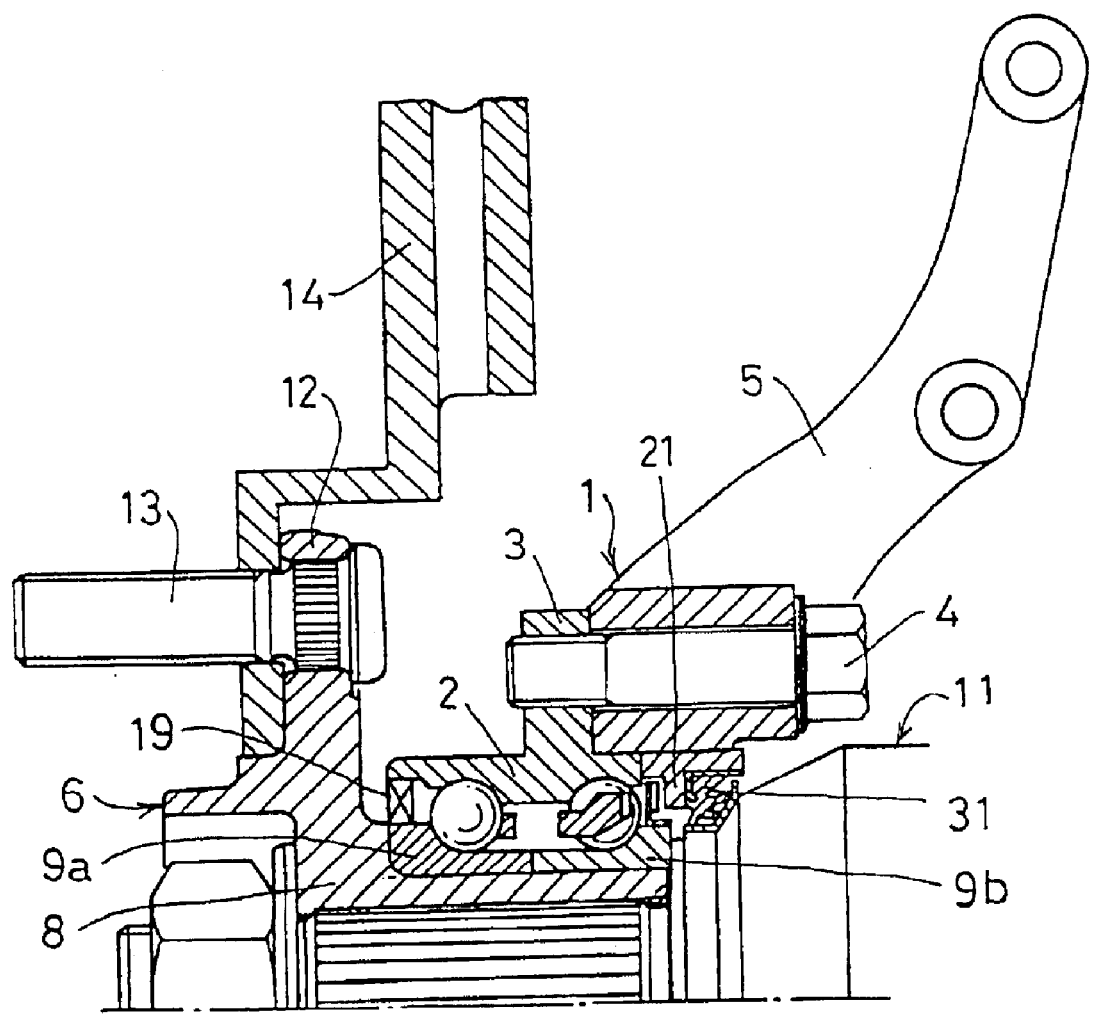
FIGS. 5–7 and 8A are enlarged sectional views of second to fifth embodiments, respectively.
Figure 6:
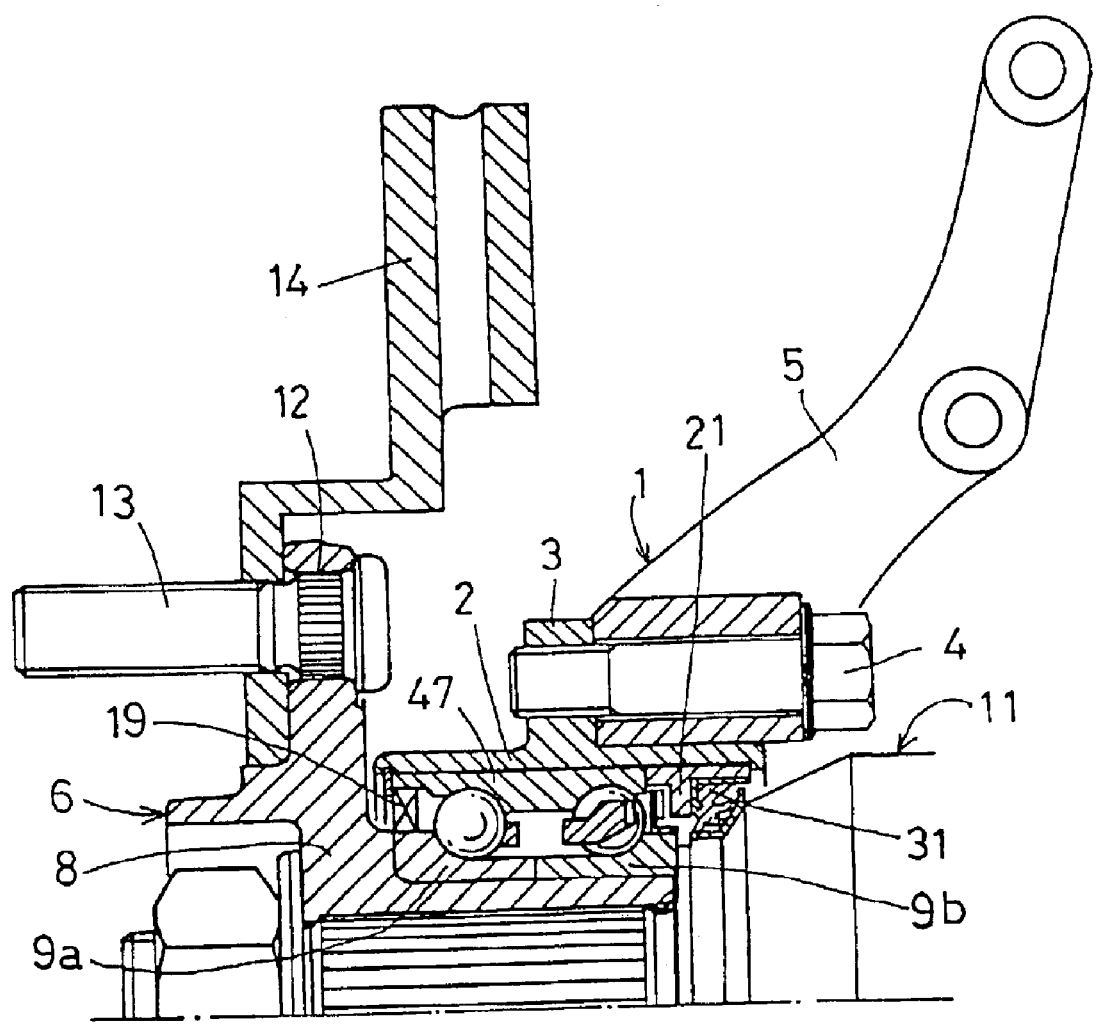

FIGS. 5–7 show modified wheel bearing assemblies embodying the invention. In the embodiments of FIGS. 5 and 6, the rotating speed sensor shown in FIG. 2 is mounted. In the embodiment of FIG. 7, the sensor unit shown in FIG. 4 is used. But any of the revolving speed sensors of FIGS. 2–4 can be mounted on any of the wheel bearing assemblies of FIGS. 5–7.

The second embodiment of FIG. 5 differs from the first embodiment only in that outboard and inboard inner rings 9a, 9b are pressed on the inner member 8.

The third embodiment (FIG. 6) differs from the second embodiment shown in FIG. 5 in that an outer ring 47 is pressed into the outer member 2.

In the fourth embodiment (FIG. 7), the outer ring 36 of the CVJ 11 has no stem 46 and is integral with the inner member 8. Raceways 16a and 16b are formed on the radially outer surface of the integral member.

In the fifth embodiment (FIG. 8), the sensor 51 includes a molded cylindrical body 52 having an elongated flange 53 at top. A sensor element 23 is embedded in the body 52. The sensor 51 is inserted in a hole formed in the knuckle 5 until the flange 53 abuts the outer surface of the knuckle and fixed in position by a bolt 54 with the sensor element 23 facing in the space defined by a small-diameter portion 55 and a shoulder 56 of the CVJ outer ring 36 on the inboard side of the outer member 2.

A mounting ring 57 having an L section is pressed on the small-diameter portion 55 and the shoulder 56 of the CVJ outer ring 36. An encoder 59 is bonded to a radial flange 58 of the mounting ring 57 so as to oppose the sensor element 23 in the sensor body 52 with a small gap therebetween.

A sensor seal 31' is mounted on an intermediate-diameter portion 61 of the CVJ outer ring 36 extending axially from the shoulder 56. The sensor seal 31' comprises a core 32' and a seal element 33' bonded to the core 32' and having two radial lips 34' kept in slide contact with a seal land formed on the radially inner surface of the knuckle 5.

A seal ring 63 is pressed onto a large-diameter portion 62 of the CVJ outer ring 36 to form a labyrinth seal between the knuckle 5 and the ring 63 and the CVJ outer ring.

An additional seal 64 is provided to seal the inboard side of the bearing gap between the outer member 2 and the inner member 8 to prevent leak of grease from the bearing 7 and entry of foreign matter such as dust.

Figure 8A:
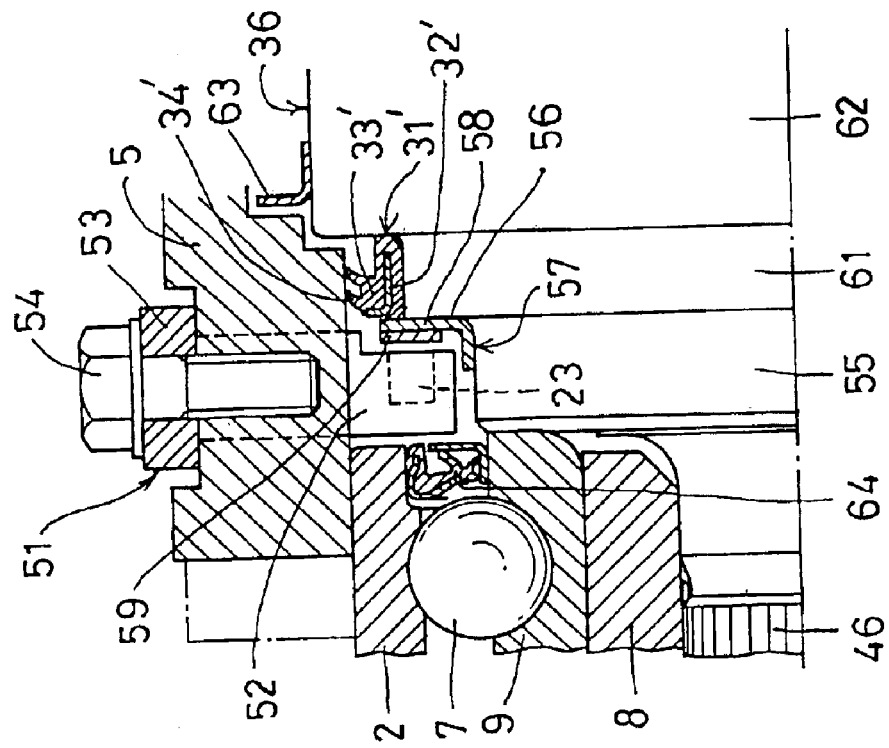
Figure 8B:
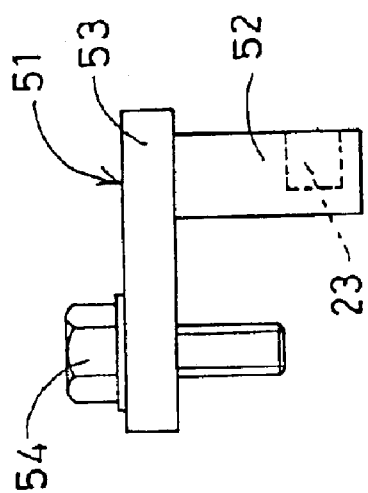
FIG. 8B is a front view of the sensor of the fifth embodiment.

Some elements not shown in FIG. 8 are identical to those shown in the previous embodiments.

The sensor 51, encoder 59 and sensor seal 31' form a rotating speed sensor unit to be mounted on the fifth embodiment of the wheel bearing assembly.

The sensor 51 and the encoder 59 are sealed by the sensor seal 31' and a labyrinth seal defined by the seal ring 63. The additional seal 64 prevents leak of grease from the bearing 7.

Figure 8C:
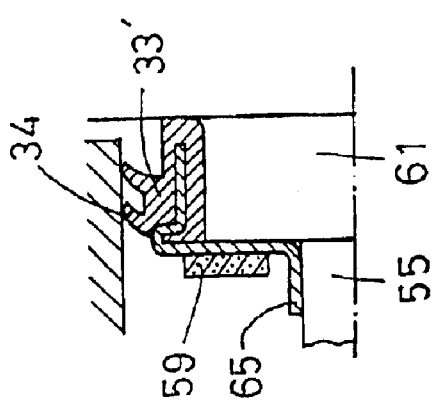
FIG. 8C is a sectional view of a modified sensor of the fifth embodiment.

As shown in FIG. 8C, the encoder 59 and the seal 33' may be bonded to a common integral ring 65, which is an integral body, not separate as the core 32' and the mounting ring 57.

The rotating speed sensor and the wheel bearing of this embodiment function in exactly the same way as those of the previous embodiments.

Since the encoder and the sensor element are sealed by the sensor seal mounted between the fixed member and the rotary member, the sensor unit can produce an accurate speed detection signal without being affected by foreign matter such as magnetized powder.

Since the sensor is made annular and the sensor seal is mounted to a portion of the annular sensor, it is not necessary to provide a sensor seal mounting portion on any other part of the wheel bearing assembly. The encoder can also be mounted in a space defined between these parts. Thus, it is possible to mount the sensor, encoder and sensor seal with enough room without the need to increase the size of any bearing parts.

By mounting the sensor on the knuckle or forming a seal land on the knuckle, the wheel bearing assembly can be assembled together in a single unit with the knuckle included as a part of the stationary member.

What is claimed is:

1. A wheel bearing assembly comprising:
   a bearing comprising rolling elements and an outer member disposed around said rolling elements, said outer member of said bearing being configured to be fitted in a cylindrical inner surface of a fixed member;
   a rotary member configured to be rotatably supported in the fixed member through said bearing and configured to be mounted to a vehicle wheel; and
   a rotational speed sensor unit comprising
   a sensor comprising a sensor body and a sensor element embedded in said sensor body, said sensor body including a cylindrical portion having a cylindrical outer surface and a cylindrical inner surface, said sensor being configured to be fitted in the fixed member such that said cylindrical outer surface of said cylindrical portion is in contact with and supported by the cylindrical inner surface of the fixed member at an inboard side of said bearing said sensor body further including a radially inwardly extending protrusion protruding radially inwardly from said cylindrical portion, and said sensor element being embedded in said radially inwardly extending protrusion of said sensor body,
   an encoder mounted on said rotary member, and
   a sensor seal having a cylindrical outer surface and fitted in said sensor such that said cylindrical outer surface of said sensor seal is in contact with and supported by said cylindrical inner surface of said cylindrical portion, thereby sealing a gap between the fixed member and said rotary member, said sensor seal comprising a seal lip kept in sliding contact with said rotary member.

2. The wheel bearing assembly of claim 1, wherein said rotary member includes a slinger having a seal land that is in contact with said seal lip, said encoder being mounted on said slinger.

3. The wheel bearing assembly of claim 2, wherein said encoder and said sensor are positioned so as to form a labyrinth seal.

4. The wheel bearing assembly of claim 2, wherein said rotary member includes an inner member adapted to be mounted to a vehicle wheel, and a constant velocity joint integral with said inner member, said slinger being fitted on an outer surface of said constant velocity joint.

5. The wheel bearing assembly of claim 1, wherein said encoder and said sensor are positioned so as to form a labyrinth seal.

6. The wheel bearing assembly of claim 1, wherein said rotary member is rotatable about an axis, and wherein said sensor is disposed such that the axis is a central axis of said sensor.

7. The wheel bearing assembly of claim 1, further comprising
a ring member fixed on said rotary member and supporting said encoder;
wherein said ring member includes a ring cylindrical portion fixed to said rotary member, and a ring flange extending radially outwardly from said ring cylindrical portion; and
wherein said encoder is mounted on said ring flange and said sensor element is embedded in said radially inwardly extending protrusion of said sensor body in such a manner that said encoder axially opposes said sensor element.

8. The wheel bearing assembly of claim 1, wherein
said sensor element is embedded in said radially inwardly extending protrusion of said sensor body so as to face radially inwardly; and
said encoder is fixed to said rotary member so as to face radially outwardly in a manner to radially oppose said sensor element.

9. The wheel bearing assembly of claim 1, wherein a labyrinth seal is formed between said encoder and said sensor.

10. The wheel bearing assembly of claim 1, wherein said fixed member includes a knuckle, and said sensor is mounted on an inner surface of said knuckle.

* * * * *